United States Patent
Inoue et al.

(10) Patent No.: US 11,225,960 B2
(45) Date of Patent: Jan. 18, 2022

(54) DIAPHRAGM PUMP

(71) Applicant: OKENSEIKO CO., LTD., Tokyo (JP)

(72) Inventors: Akira Inoue, Tokyo (JP); Kazuki Itahara, Tokyo (JP)

(73) Assignee: OKENSEIKO CO., LTD., Tokyo (JP)

( * ) Notice: Subject to any disclaimer, the term of this patent is extended or adjusted under 35 U.S.C. 154(b) by 0 days.

(21) Appl. No.: 16/684,390

(22) Filed: Nov. 14, 2019

(65) Prior Publication Data
US 2020/0173433 A1 Jun. 4, 2020

(30) Foreign Application Priority Data
Nov. 30, 2018 (JP) .............................. JP2018-224701

(51) Int. Cl.
F04B 43/02 (2006.01)
F16K 15/14 (2006.01)
F04B 53/10 (2006.01)

(52) U.S. Cl.
CPC .......... F04B 43/02 (2013.01); F04B 53/1065 (2013.01); F16K 15/148 (2013.01)

(58) Field of Classification Search
CPC ...... F04B 43/02; F04B 45/04; F04B 53/1037; F04B 53/106; F04B 53/1065; F04B 43/04; F04B 53/10; F04B 53/1047; F04B 53/108; F16K 15/148
See application file for complete search history.

(56) References Cited

U.S. PATENT DOCUMENTS

| | | | |
|---|---|---|---|
| 2009/0068036 A1* | 3/2009 | Hsu | F04B 43/026 417/410.1 |
| 2010/0215522 A1 | 8/2010 | Kawamura et al. | |
| 2018/0223824 A1 | 8/2018 | Akira | |

FOREIGN PATENT DOCUMENTS

| | | | |
|---|---|---|---|
| CN | 1428511 A | 7/2003 | |
| CN | 200943569 Y | 9/2007 | |
| DE | 4439880 A1 * | 5/1996 | ........... F16K 15/148 |
| JP | 2008-180171 A | 8/2008 | |
| JP | 2008180171 A * | 8/2008 | |
| JP | 2013-192639 A | 9/2013 | |
| JP | 2018-112127 A | 7/2018 | |

OTHER PUBLICATIONS

European Search Report and Search Opinion received for EP Patent Application No. 19209884.6, dated Apr. 28, 2020, 8 pages.
Office Action received for Chinese Patent Application No. 201911189481.4, dated Jun. 3, 2021, 11 pages (5 pages of English Translation and 6 pages of Office Action).

* cited by examiner

*Primary Examiner* — Philip E Stimpert
(74) *Attorney, Agent, or Firm* — Womble Bond Dickinson (US) LLP

(57) ABSTRACT

A diaphragm pump includes a suction valve configured to open and close a suction passage to a pump chamber. The suction valve is made of an elastic material and includes a shaft and a valve element. The upper end portion of the shaft includes a projection. A diaphragm holder includes a shaft hole in which the lower end portion of the shaft is inserted, and a seat surface to which part of the suction passage opens. A diaphragm housing presses the upper end portion of the shaft toward the lower end portion and holds the shaft together with the diaphragm holder. The valve element thus comes into tight contact with the seat surface.

3 Claims, 5 Drawing Sheets

DIAPHRAGM PUMP

BACKGROUND OF THE INVENTION

The present invention relates to a diaphragm pump including an umbrella valve made of an elastic material.

A diaphragm pump including an umbrella valve is disclosed in, for example, Japanese Patent Laid-Open No. 2018-112127 (literature 1) and Japanese Patent Laid-Open No. 2013-192639 (literature 2).

The diaphragm pump disclosed in literature 1 includes a suction valve formed from an umbrella valve. The suction valve will be described with reference to FIGS. 7 and 8. As shown in FIG. 7, a suction valve 1 is attached to a through hole 3 of a housing member 2, and opens and closes a suction passage 5 formed in the housing member 2. The housing member 2 forms a pump chamber 8 together with a pump portion 7 of a diaphragm 6.

The suction valve 1 includes a shaft 4 inserted into the through hole 3, and a plate-shaped valve element 9 integrally provided at one end portion of the shaft 4 located in the pump chamber 8. A stopper 4a having a diameter larger than the hole diameter of the through hole 3 and a knob portion 4b projecting from the stopper 4a in the longitudinal direction are provided at the other end portion of the shaft 4 shown in FIG. 7. Before the suction valve 1 is assembled in the housing member 2, the knob portion 4b is formed long such that the stopper 4a is located in the middle part of the shaft 4, as shown in FIG. 8.

When the shaft 4 is inserted into the through hole 3, and the knob portion 4b is picked up and pulled such that the stopper 4a projects from the housing member 2, the suction valve 1 is attached to the housing member 2. After that, as shown in FIG. 7, the knob portion 4b is cut near the stopper 4a. In a state in which the suction valve 1 is attached to the housing member 2, the shaft 4 pulls the valve element 9 and the stopper 4a, and the valve element 9 is pressed against a seat surface 2a of the housing member 2 by a predetermined pressing force. Note that FIG. 7 illustrates the suction valve 1 in an open state.

An umbrella valve disclosed in literature 2 includes a shaft, and a plate-shaped valve element formed at the center portion of the shaft in the axial direction. The umbrella valve is arranged between two housing members. One end portion of the shaft is fitted in the shaft hole of one housing member, and the other end portion is fitted in the shaft hole of the other housing member. The umbrella valve is configured such that the valve element is in tight contact with the seat surface of one housing member in a state in which the two end portions of the shaft are fitted in the shaft holes.

In the diaphragm pump disclosed in literature 1, since the knob portion 4b is cut after the umbrella valve is assembled in the housing member 2, cutting operations increase, resulting in an increase in cost. On the other hand, if a structure in which the knob portion 4b is left without being cut is employed, other parts cannot be arranged at optimum positions to avoid interference with the knob portion 4b, and the diaphragm pump becomes bulky. Hence, the diaphragm pump disclosed in literature 1 can hardly implement both cost reduction and size reduction because of the knob portion 4b of the umbrella valve.

The umbrella valve disclosed in literature 2 can easily implement cost reduction and size reduction because the knob portion 4b is not necessary. In this umbrella valve, however, the position of the valve element in the axial direction of the shaft is hard to be constant because of the manufacturing error of the shaft or the shaft holes of the housing members, and the accuracy of the position of the seal surface is low. For this reason, the force for pressing the valve element against the seat surface is not constant, and the quality varies.

SUMMARY OF THE INVENTION

It is an object of the present invention to implement an umbrella valve in which the accuracy of the position of a seal surface is high and provide a diaphragm pump capable of implementing cost reduction and size reduction.

In order to achieve the object, according to the present invention, there is provided a diaphragm pump comprising a diaphragm including a pump portion, a pump housing configured to store the diaphragm and form a pump chamber together with the pump portion, a suction passage through which a fluid flows to the pump chamber when the pump chamber expands, a discharge passage through which a fluid discharged from the pump chamber flows when the pump chamber contracts, a suction valve arranged in the suction passage and configured to open and close the suction passage, and a discharge valve arranged in the discharge passage and configured to open and close the discharge passage, wherein at least one valve of the suction valve and the discharge valve is made of an elastic material, and includes a shaft including a first end portion and a second end portion, and a plate-shaped valve element extending from the first end portion of the shaft in a direction orthogonal to an axis of the shaft, the pump housing includes a first housing member including a shaft hole formed from a blind hole in which the second end portion of the shaft is inserted, and a seat surface to which one of part of the suction passage and part of the discharge passage opens, and a second housing member configured to press the first end portion of the shaft inserted into the shaft hole toward the second end portion and hold the shaft together with the first housing member, the first end portion of the shaft includes a projection projecting toward the second housing member, and the valve element is formed to come into tight contact with the seat surface when the shaft is sandwiched between the first housing member and the second housing member.

DESCRIPTION OF THE PREFERRED EMBODIMENT

A diaphragm according to an embodiment of the present invention will now be described in detail with reference to FIGS. 1 to 6.

Figure 1:
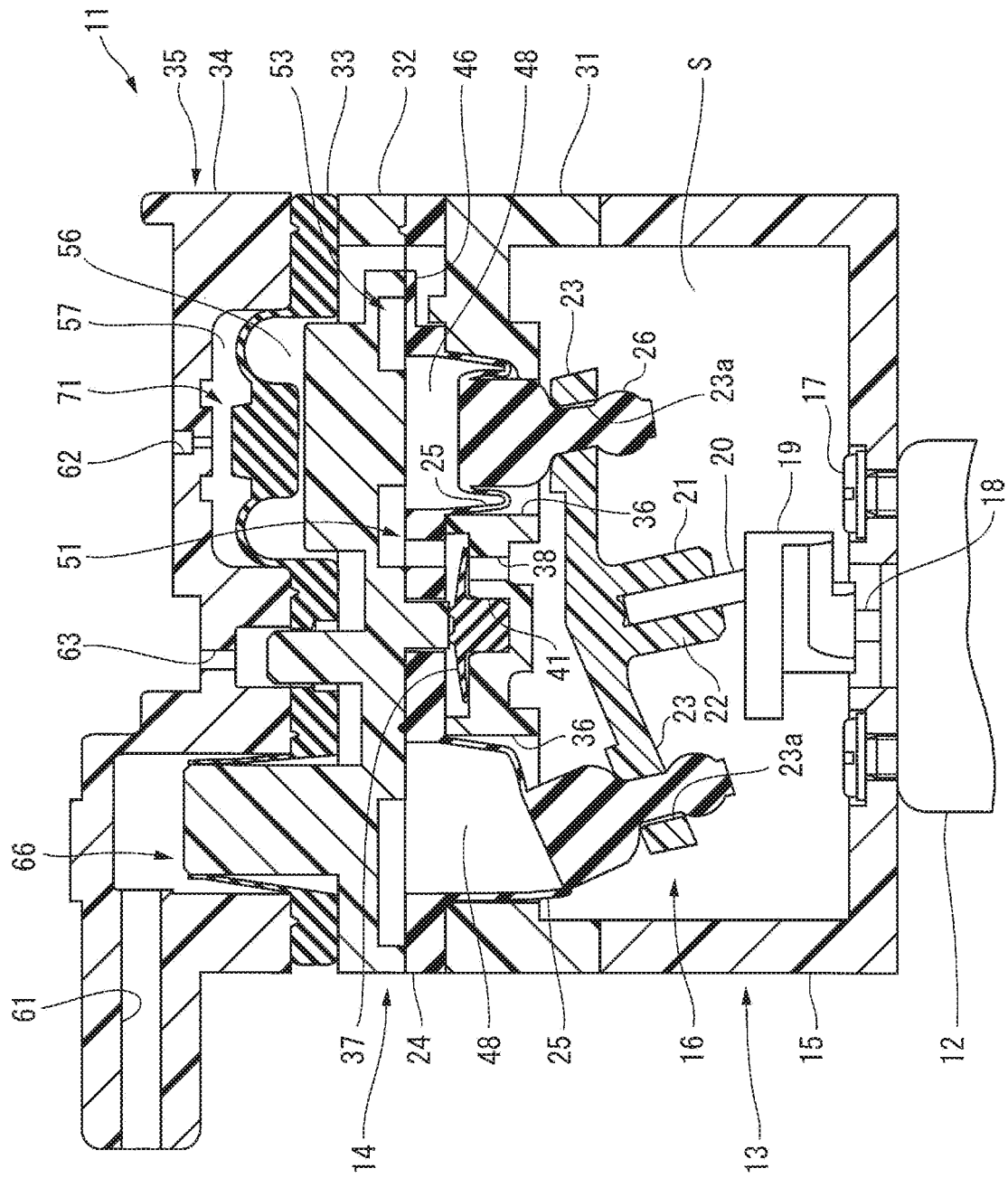
FIG. 1 is a sectional view of a diaphragm pump according to an embodiment of the present invention.

A diaphragm pump 11 shown in FIG. 1 is attached to a motor 12 located at the lowermost position in FIG. 1. The diaphragm pump 11 is driven by the motor 12 and operates. The diaphragm pump 11 according to this embodiment is a pump that sucks and discharges air. The diaphragm pump 11 includes a driving unit 13 fixed to the motor 12, and a valve portion 14 attached to the driving unit 13.

<Driving Unit>

The driving unit 13 includes a driving unit housing 15 fixed to the motor 12, and a driving mechanism 16 stored in the housing 15. The housing 15 is formed into a bottomed cylindrical shape, and the driving mechanism 16 fixed to the motor 12 by fixing bolts 17 includes a crank body 19 attached to a rotating shaft 18 of the motor 12, a driving body 21 connected to the crank body 19 via a driving shaft 20, and the like.

The driving shaft 20 tilts in a predetermined direction with respect to the rotating shaft 18. The driving body 21 includes a columnar shaft portion 22 rotatably supported by the driving shaft 20, and a plurality of arm portions 23 projecting outward from the shaft portion 22 in the radial direction. The arm portions 23 are provided for pump portions 25 of a diaphragm 24 to be described later, respectively, and radially extend outward from the shaft portion 22 in the radial direction. A through hole 23a is formed in each arm portion 23. A connecting piece 26 of the diaphragm 24 is inserted into the through hole 23a. The connecting piece 26 extends through the arm portion 23 and is fixed to the arm portions 23 in this state.

According to the driving mechanism 16, when the crank body 19 and the driving shaft 20 rotate together with the rotating shaft 18 of the motor 12, the driving body 21 swings, and the pump portions 25 of the diaphragm 24 repetitively contract and expand.

<Valve Portion>

The valve portion 14 includes a diaphragm holder 31 attached to the opening portion of the above-described driving unit housing 15, the diaphragm 24 arranged on the diaphragm holder 31, a diaphragm housing 32 attached to the diaphragm holder 31 in a state in which the diaphragm 24 is sandwiched between the diaphragm housing 32 and the diaphragm holder 31, a partition 33 arranged on the diaphragm housing 32, a cover 34 attached to the diaphragm housing 32 via the partition 33, and the like.

The diaphragm holder 31, the diaphragm housing 32, and the cover 34 are each formed into a circular shape when viewed from the axial direction of the motor 12. In this embodiment, the diaphragm holder 31, the diaphragm housing 32, the cover 34, and the above-described driving unit housing 15 form a pump housing 35. The pump housing 35 stores the above-described members including the diaphragm 24.

<Diaphragm Holder>

Figure 2:
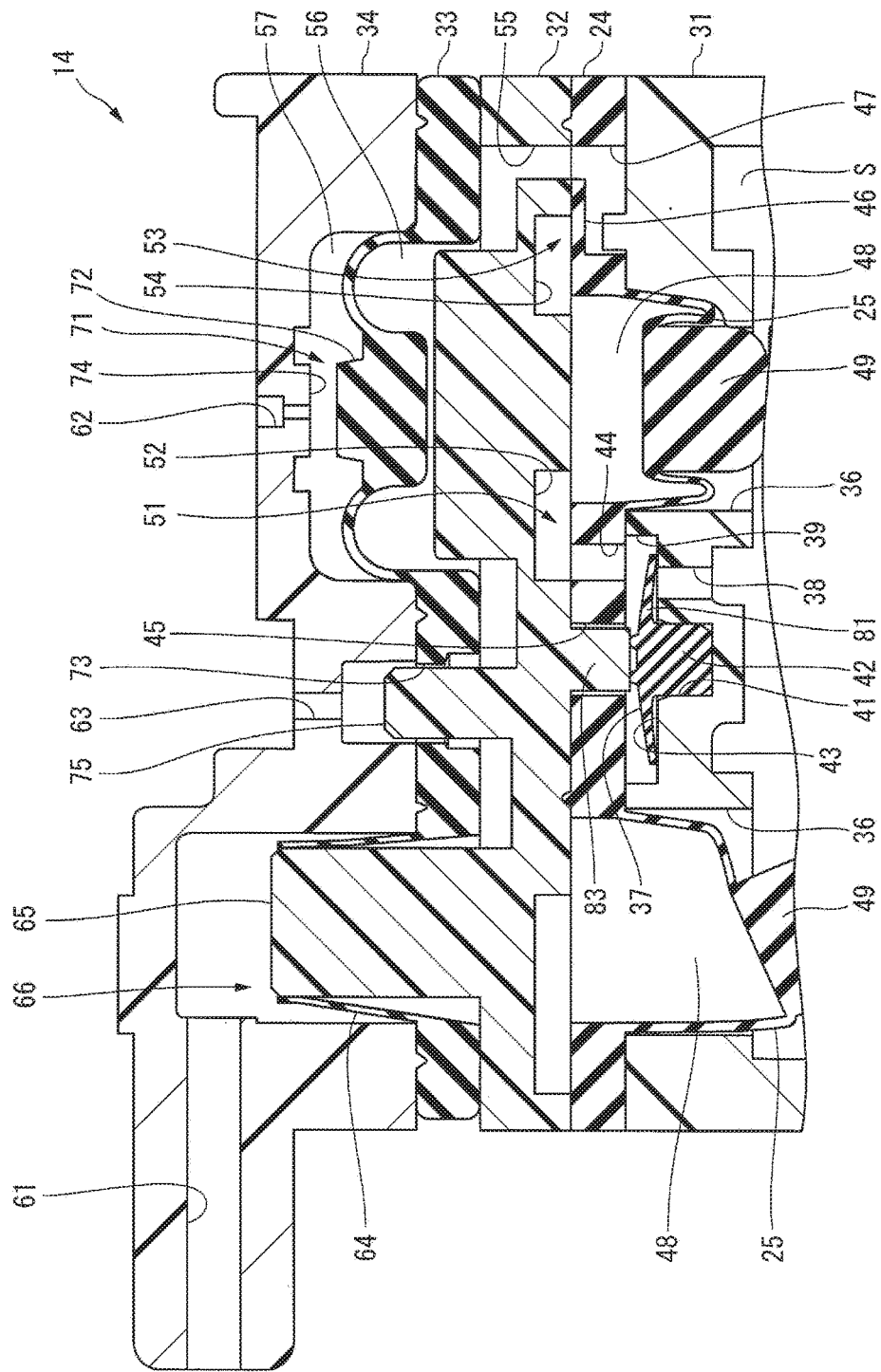
FIG. 2 is an enlarged sectional view of a valve element.

The diaphragm holder 31 is formed into a disc shape connectable to the driving unit housing 15, and includes a plurality of through holes, as shown in FIG. 2. The through holes include cylinder holes 36 for the pump portions, in which the pump portions 25 of the diaphragm 24 are inserted, and a suction hole 38 to be opened and closed by a suction valve 37. The cylinder holes 36 and the suction hole 38 open to a housing space S surrounded by the driving unit housing 15 and the diaphragm holder 31.

The suction hole 38 forms part of a suction passage 51 to be described later, and makes the housing space S communicate with a circular concave portion 39 formed at the center portion of the diaphragm holder 31. A shaft hole 41 formed by a blind hole is formed at the center portion of the circular concave portion 39. A shaft 42 of the suction valve 37 is fitted in the shaft hole 41. The structure of the suction valve 37 will be described later. The bottom surface of the circular concave portion 39 is formed flat to form a seat surface 43. The suction hole 38 and the shaft hole 41 open to the seat surface 43.

<Diaphragm>

The diaphragm 24 is sandwiched between the diaphragm holder 31 and the diaphragm housing 32 and held. The diaphragm 24 includes the plurality of cup-shaped pump portions 25 that open toward the diaphragm housing 32, a plurality of first through holes 44 located on the center side of the diaphragm holder 31 with respect to the pump portions 25 and provided for the pump portions 25, respectively, a second through hole 45 located at the center portion of the diaphragm holder 31, a plurality of discharge valves 46 and a plurality of through holes 47, which are located on the outer periphery side of the diaphragm holder 31 with respect to the pump portions 25 and provided for the pump portions 25, respectively, and the like.

The pump portions 25 are arranged at positions that divide the diaphragm 24 into a plurality of parts in the circumferential direction of the diaphragm holder 31. The pump portions 25 are inserted into the cylinder holes 36 formed in the diaphragm holder 31. The opening portions of the pump portions 25 are closed by the diaphragm housing 32. A pump chamber 48 is formed between each pump portion 25 and the diaphragm housing 32. That is, the pump housing 35 including the diaphragm housing 32 forms the pump chambers 48 together with the pump portions 25. A piston 49 is provided on the bottom of each pump portion 25 having a cup shape. The piston 49 is provided with the connecting piece 26 that projects in a direction opposite to the pump chamber 48. The connecting piece 26 is connected to the driving body 21 of the driving mechanism 16.

A first groove 52 that forms part of a suction passage 51 and a second groove 54 that forms part of a discharge passage 53 are formed in a portion of the diaphragm housing 32, which forms the wall of the pump chamber 48. The first groove 52 extends from the pump chamber 48 toward the center of the diaphragm housing 32, and is connected to the first through hole 44 of the diaphragm 24.

The suction passage 51 is formed by the first groove 52, the first through holes 44, the suction hole 38 and the circular concave portion 39 of the diaphragm holder 31, and the like. The circular concave portion 39 is connected to all the suction passages 51 provided of the pump chambers 48, although not illustrated. When the pump chamber 48 expands to open the suction valve 37 to be described later, the air in the housing space S flows through the suction passage 51 toward the pump chamber 48.

The second groove 54 extends from the pump chamber 48 up to a position facing the discharge valve 46 of the diaphragm 24. The discharge valve 46 is formed to close one end portion (downstream-side end portion) of the second groove 54 in the outer peripheral portion of the diaphragm housing 32. The discharge valve 46 opens the discharge passage 53 when the pressure in the pump chamber 48 is higher than the pressure in the through hole 47 (discharge passage 53) of the diaphragm 24. In addition, the discharge valve 46 closes the discharge passage 53 when the pressure in the pump chamber 48 is lower than the pressure in the through hole 47 (discharge passage 53). The through hole 47 of the diaphragm 24 is connected to one end portion of a passage hole 55 of the diaphragm housing 32. The other end portion of the passage hole 55 is connected to an input-side space 56 formed between the diaphragm housing 32 and the partition 33 to be described later.

The discharge passage 53 is formed by the second groove 54, the through hole 47, the passage hole 55, and the like.

The discharge valve 46 is arranged in the discharge passage 53 and opens and closes the discharge passage 53. When the pump chamber 48 contracts, the discharge valve 46 opens, and air discharged from the pump chamber 48 flows through the discharge passage 53.

The partition 33 is sandwiched between the diaphragm housing 32 and the cover 34 and held. The partition 33 is formed into a plate shape by an elastic material such as a rubber material including synthetic rubber and partitions between the diaphragm housing 32 and the cover 34. The input-side space 56 is formed between the partition 33 and the diaphragm housing 32, and an output-side space 57 is formed between the partition 33 and the cover 34.

The input-side space 56 and the output-side space 57 are divided by the partition 33. The output-side space 57 is connected to an outlet passage 61 provided in one side portion (the left side portion in FIG. 2) of the cover 34, a main exhaust passage 62 provided in the other side portion of the cover 34, and a sub-exhaust passage 63 provided at the center portion of the cover 34 via a communicating path (not shown).

A cylindrical valve element 64 projecting toward the cover 34 is provided in one side portion (the left side portion in FIG. 2) of the partition 33. The cylindrical valve element 64 forms a check valve 66 together with a column 65 of the diaphragm housing 32. The check valve 66 makes air in the input-side space 56 flow to the output-side space 57, and also prevents a backflow from the output-side space 57 to the input-side space 56. The column 65 forms the valve seat of the check valve 66. The cylindrical valve element 64 has a cylindrical shape covering the outer peripheral surface of the column 65. The projecting end of the cylindrical valve element 64 is separably in tight contact with the outer peripheral surface of the column 65 all over the circumferential direction. The diameter of the base end portion of the cylindrical valve element 64 is larger than the diameter of the column 65. The space between the cylindrical valve element 64 and the column 65 is part of the input-side space 56.

The partition 33 is provided with a valve element 72 of a rapid discharge valve 71 and a circular hole 73 connected to the sub-exhaust passage 63. The rapid discharge valve 71 is formed by the valve element 72, and a valve seat 74 to which the main exhaust passage 62 opens. The valve element 72 is moved by the pressure difference between the input-side space 56 and the output-side space 57, thereby opening and closing the main exhaust passage 62. A columnar projection 75 of the diaphragm housing 32 is inserted into the circular hole 73. The columnar projection 75 is spaced apart from the hole wall surface of the circular hole 73 at a small gap. Hence, the input-side space 56 is opened to the atmosphere via the small gap between the columnar projection 75 and the circular hole 73 and the sub-exhaust passage 63 of the cover 34.

<Suction Valve>

Figure 3:
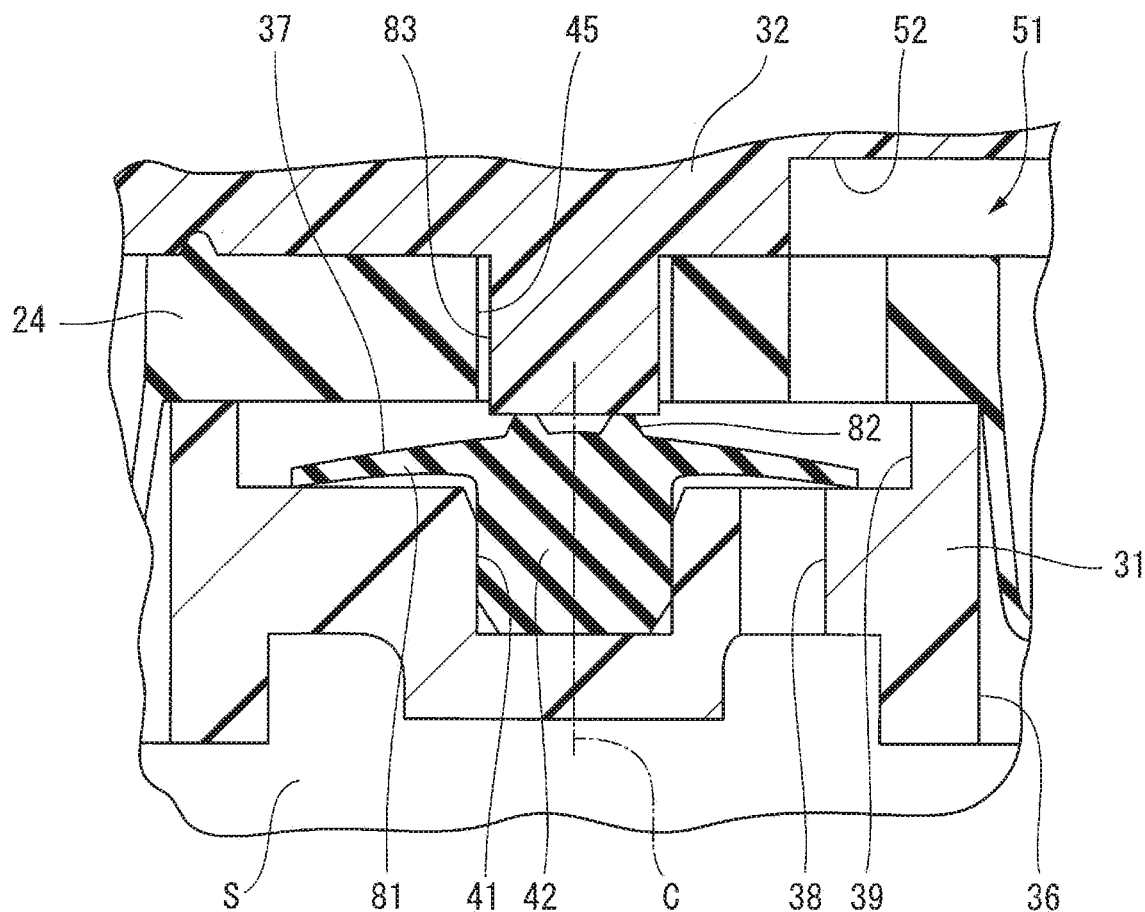
FIG. 3 is an enlarged sectional view of a main part.

The suction valve 37 is an umbrella valve, and includes the shaft 42 and a valve element 81, as shown in FIGS. 2 and 3. The shaft 42 is formed into a columnar shape, and includes an upper end portion serving as a first end portion, and a lower end portion serving as a second end portion. The lower end portion of the shaft 42 is inserted into the shaft hole 41 of the diaphragm holder 31. The upper end portion of the shaft 42 is provided with a projection 82 that projects toward the diaphragm housing 32. The valve element 81 is formed into a plate shape extending from the upper end portion of the shaft 42 in a direction orthogonal to an axis C (see FIG. 3). The valve element 81 according to this embodiment is formed into a so-called umbrella shape. The suction valve 37 is made of an elastic material such as a rubber material including synthetic rubber. For this reason, the shaft 42 including the projection 82 and the valve element 81 are integrally formed.

A columnar body 83 is provided in a portion of the diaphragm housing 32 facing the shaft 42. The columnar body 83 is formed into a columnar shape, inserted into the second through hole 45 of the diaphragm 24, and is in contact with the projection 82. The distal end face of the columnar body 83 in contact with the projection 82 is formed flat.

The total length of the shaft 42 including the projection 82 is slightly longer than the interval between the bottom of the shaft hole 41 of the diaphragm holder 31 and the distal end of the columnar body 83 of the diaphragm housing 32 in a completed state of the diaphragm pump 11. For this reason, the diaphragm housing 32 including the columnar body 83 presses the upper end portion of the shaft 42 inserted into the shaft hole 41 toward the lower end portion, and holds the shaft 42 together with the diaphragm holder 31. In this embodiment, the diaphragm holder 31 forms a "first housing member", and the diaphragm housing 32 forms a "second housing member".

Figure 5:
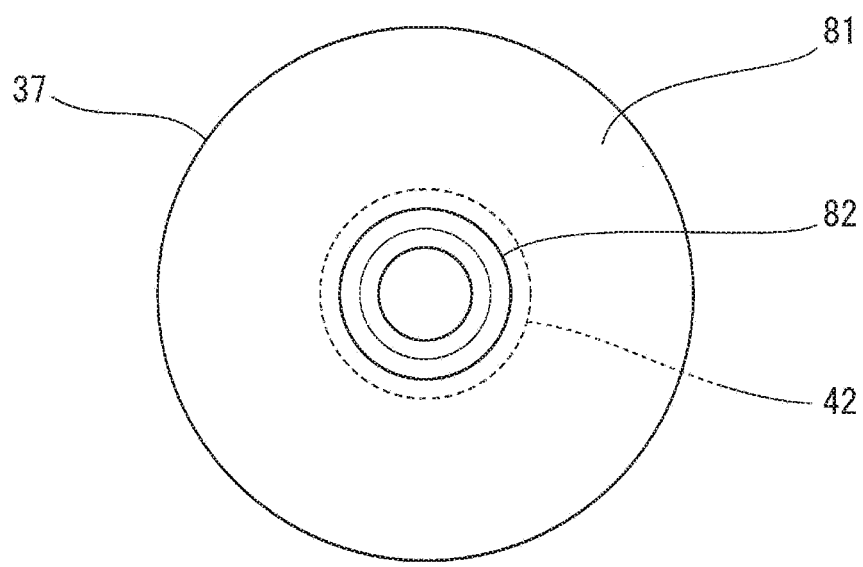
FIG. 5 is a plan view of the suction valve viewed from an axial direction.

The projection 82 according to this embodiment is a ridge having a chevron sectional shape, and is formed into an annular shape when viewed from the axial direction of the shaft 42, as shown in FIG. 5. In a state in which the suction valve 37 is assembled between the diaphragm holder 31 and the diaphragm housing 32, the distal end of the projection 82 is pressed by the distal end face of the columnar body 83, and the projection 82 is deformed so as to buckle.

As shown in FIG. 5, the valve element 81 has a circular shape when viewed from the axial direction of the shaft 42. The outer diameter of the valve element 81 is smaller than the inner diameter of the circular concave portion 39 of the diaphragm holder 31.

The valve element 81 according to this embodiment is convex toward the diaphragm housing 32, and has a curved shape that forms part of a spherical surface. When the shaft 42 is sandwiched between the diaphragm holder 31 and the diaphragm housing 32, the valve element 81 is brought into tight contact with the seat surface 43 of the circular concave portion 39 by a predetermined pressing force. When the valve element 81 comes into tight contact with the seat surface 43, the opening of the suction hole 38 is closed, and the suction passage 51 is closed.

The suction valve 37 opens the suction passage 51 when the pressure in the pump chamber 48 is lower than the pressure in the suction hole 38 (suction passage 51). In addition, the suction valve 37 closes the suction passage 51 when the pressure in the pump chamber 48 is higher than the pressure in the suction hole 38 (suction passage 51). That is, the suction valve 37 is arranged in the suction passage 51, and opens and closes the suction passage 51.

<Operation>

In the thus configured diaphragm pump 11, when the motor 12 is driven, the rotary motion of the motor 12 is converted into a vertical motion by the driving mechanism 16, and the pump portions 25 of the diaphragm 24 repetitively contract and expand. When the pump portion 25 of the diaphragm 24 expands, the suction valve 37 opens, and the air in the housing space S is sucked into the pump chamber 48 via the suction passage 51. In addition, when the pump portion 25 of the diaphragm 24 contracts, the discharge valve 46 opens, and the air in the pump chamber 48 is sent to the input-side space 56. When the pressure in the input-side space 56 rises, the rapid discharge valve 71 is closed, and the air in the input-side space 56 flows to the output-side space 57 via the check valve 66, and is supplied to the outlet passage 61.

When the motor 12 stops, since the air in the input-side space 56 is discharged to the outside of the pump via the sub-exhaust passage 63, the pressure in the input-side space 56 lowers, and the rapid discharge valve 71 opens accordingly. When the rapid discharge valve 71 opens, the air in the output-side space 57, that is, the air in the outlet passage 61 is discharged to the outside of the pump via the main exhaust passage 62.

In the suction valve 37 of the diaphragm pump 11, the shaft 42 is sandwiched between the diaphragm holder 31 and the diaphragm housing 32 and held. At this time, when the shaft 42 is compressed in the axial direction, the valve element 81 is pressed against the seat surface 43 by a predetermined pressing force. Since it is therefore possible to assemble the suction valve 37 without using a knob portion, unlike an associated umbrella valve, the knob portion is unnecessary in the suction valve 37.

When the shaft 42 is compressed, the projection 82 is elastically deformed. The magnitude of the pressing force that the shaft 42 receives from the diaphragm holder 31 and the diaphragm housing 32 increases/decreases within the range of tolerance of parts. If the pressing force is relatively large, the elastic deformation amount of the projection 82 increases. If the pressing force is relatively small, the elastic deformation amount of the projection 82 decreases. Hence, in the suction valve 37, even if the dimensional accuracy of each part has a tolerance, the force for pressing the valve element 81 against the seat surface 43 can easily be made moderate. This means that the accuracy of the position of the seal surface of the valve element 81 becomes high.

Hence, according to this embodiment, it is possible to implement an umbrella valve in which the accuracy of the position of a seal surface is high and provide the diaphragm pump 11 capable of implementing cost reduction and size reduction.

The projection 82 of the suction valve 37 according to this embodiment is a ridge having a chevron sectional shape, and is formed into an annular shape when viewed from the axial direction of the shaft 42. For this reason, the pressing force received from the columnar body 83 of the diaphragm housing 32 is readily transmitted to the circular valve element 81. As a result, since the valve element 81 is evenly in tight contact with the seat surface 43 all over the circumferential direction, sealing performance becomes high.

<Modification>

Figure 6:
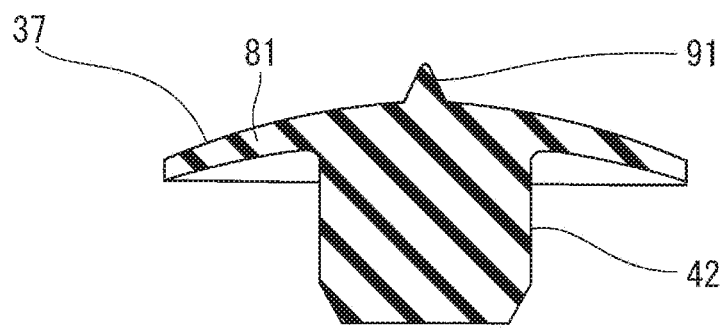
FIG. 6 is a sectional view showing a modification of a projection.
Figure 7:
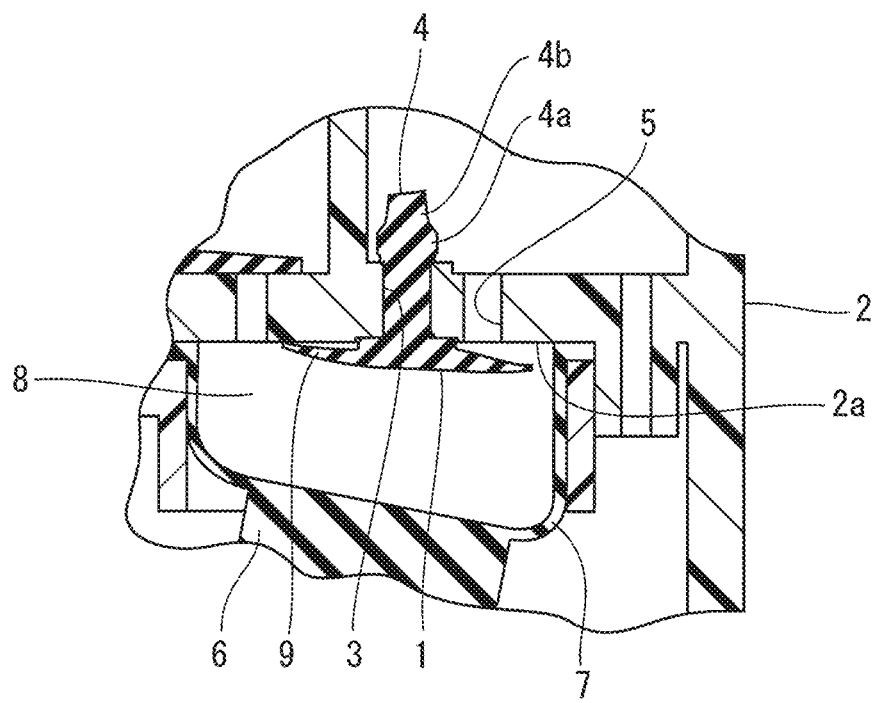
FIG. 7 is a sectional view showing part of an associated diaphragm pump.
Figure 8:
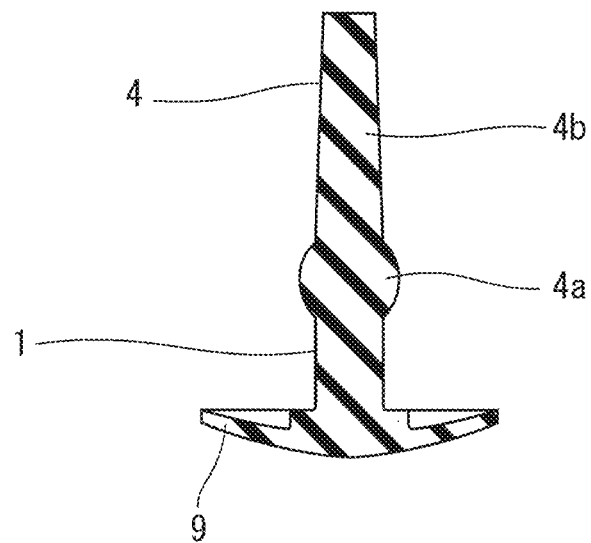
FIG. 8 is a sectional view of an associated umbrella valve.

The projection of the suction valve can be formed as shown in FIG. 6. In FIG. 6, the same reference numerals as in FIGS. 1 to 5 denote members similar to those described above, and a detailed description of the members will be omitted.

A projection 91 of the suction valve 37 shown in FIG. 6 is formed into one chevron shape, and located on the same axis as the shaft 42. The projection 82 according to this embodiment is formed into a conical shape. The projection 82 having such a chevron shape is easily elastically deformed as compared to the projection 82 formed from an annular ridge as shown in FIGS. 1 to 5. For this reason, when the projection 91 shown in FIG. 6 is used, the projection 91 is elastically deformed even in a case in which the pressing force received from the columnar body 83 is relatively small. Hence, the position accuracy of the seal surface of the valve element 81 becomes high.

In the above-described embodiment, an example in which the present invention is applied to the suction valve 37 has been shown. However, the present invention is not limited to this. That is, the present invention can be applied to the discharge valve, or can be applied to both the suction valve and the discharge valve.

Figure 4:
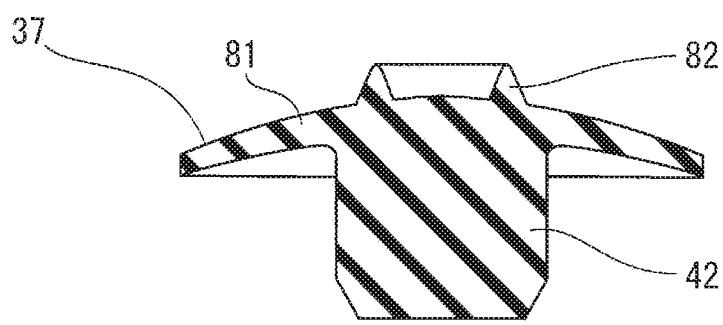
FIG. 4 is a sectional view of a suction valve.

If the discharge valve 46 having the same structure as the suction valve 37 shown in FIGS. 4 to 6 is used, the circular concave portion 39 is formed in the diaphragm housing 32. The bottom surface of the circular concave portion 39 forms the seat surface 43. The shaft hole 41 formed from a blind hole in which the lower end portion (second end portion) of the shaft 42 of the discharge valve 46 is inserted and the second groove 54 that forms part of the discharge passage 53 open to the seat surface 43. Additionally, in the diaphragm holder 31, the columnar body 83 is formed at a portion facing the shaft 42 of the discharge valve 46. The diaphragm holder 31 presses the upper end portion (first end portion) of the shaft 42 inserted into the shaft hole 41 toward the lower end portion, and holds the shaft 42 together with the diaphragm housing 32. The valve element 81 of the discharge valve 46 thus comes into tight contact with the seat surface 43. In this case, the diaphragm housing 32 forms the "first housing member", and the diaphragm holder 31 forms the "second housing member".

Additionally, in the above-described embodiment, an example in which the present invention is applied to the diaphragm pump 11 for air has been shown. However, the present invention can also be applied to a pump that sucks and discharges a fluid such as another gas or a liquid.

What is claimed is:

1. A diaphragm pump comprising:
a diaphragm including a pump portion;
a pump housing configured to store the diaphragm and form a pump chamber together with the pump portion;
a suction passage through which a fluid flows to the pump chamber when the pump chamber expands;
a discharge passage through which a fluid discharged from the pump chamber flows when the pump chamber contracts;
a suction valve arranged in the suction passage and configured to open and close the suction passage; and
a discharge valve arranged in the discharge passage and configured to open and close the discharge passage,
wherein at least one valve of the suction valve and the discharge valve
is made of an elastic material, and
includes a shaft including a first end portion and a second end portion, and a plate-shaped valve element extending from the first end portion of the shaft in a direction orthogonal to an axis of the shaft,
the pump housing includes:
a first housing member including a shaft hole formed from a blind hole in which the second end portion of the shaft is inserted, and a seat surface to which one of part of the suction passage and part of the discharge passage opens; and
a second housing member configured to press the first end portion of the shaft inserted into the shaft hole toward the second end portion such that the second end portion of the shaft contacts with a bottom of the shaft hole and hold the shaft together with the first housing member,
the first end portion of the shaft includes a projection projecting toward the second housing member, and
the projection is configured to be pressed toward the second end portion by the second housing member and the valve element is configured to come into tight contact with the seat surface when the shaft is sandwiched between the first housing member and the second housing member.

2. The diaphragm pump according to claim 1, wherein the projection is a ridge formed into an annular shape when viewed from a direction of the axis of the shaft and having a chevron sectional shape.

3. The diaphragm pump according to claim 1, wherein the projection is formed into a chevron shape.

* * * * *